July 18, 1950 P. J. KOLICH 2,515,717
AUTOMOBILE SIGNAL SYSTEM
Filed Oct. 19, 1948

INVENTOR,
PETER J. KOLICH.
BY
Stephen S. Townsend
ATTORNEY.

Patented July 18, 1950

2,515,717

UNITED STATES PATENT OFFICE 2,515,717

AUTOMOBILE SIGNAL SYSTEM

Peter J. Kolich, Hayward, Calif.

Application October 19, 1948, Serial No. 55,396

1 Claim. (Cl. 177—327)

This invention relates to new and useful improvements in visible and audible stop and turn indicators for motor vehicles.

It is a principal object of this invention to provide a visible indicator controllable at the will of the operator to indicate to occupants of other vehicles and to pedestrians the intention of the operator to turn or stop his vehicle.

It is another object of this invention to provide in connection with such an indicator means for illuminating the pointer to increase its visibility during night-time or when weather conditions are adverse.

It is a further object of this invention to provide in connection with such an indicator an audible signal, such as the horn of the vehicle, which is arranged to sound during the time that the indicator is moving toward indicating position so as to attract the attention of passers-by and operators of other vehicles to the visible signal.

Another object of this invention is to provide a manual control readily accessible to the operator of the vehicle which may be set to indicate a stop or turn and which thereby simultaneously positions a pointer in a prominent location on the outside of the vehicle to indicate whether a stop or turn is being made and the direction of the turn, illuminate the pointer and sound the horn all without further attention from the operator.

Referring to the drawings.

Figure 1:
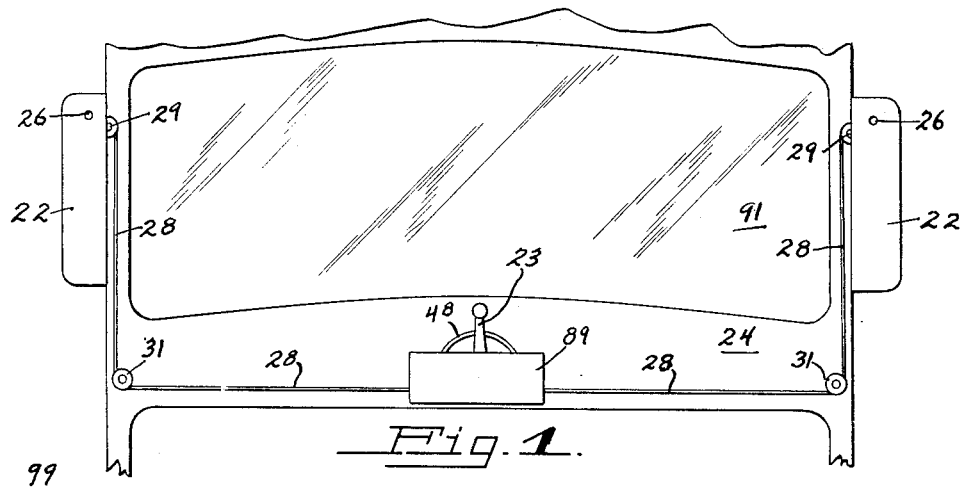
Fig. 1 is an elevational view showing the device installed on a vehicle.

The purpose of this invention is to provide a visible and audible signal to indicate to operators of other vehicles contemplated changes in direction or stoppage of the vehicle on which it is installed. For such purpose left hand pointer 20 and right hand pointer 21 in the shape of arrows are installed in suitable housings 22 on opposite sides of the vehicle so that the pointers 20 and 21 are normally concealed from view except when the mechanism hereinafter described is actuated. The control for the pointers 20 and 21 consists of an actuating lever 23 conveniently mounted on the dashboard 24 or other readily accessible portion of the interior of the vehicle which may be readily grasped by the operator when a change in direction or stoppage of the vehicle is contemplated. Actuation of the lever 23 under the control of the operator causes the proper pointer 20 or 21 to be exposed from within its housing 22 and likewise causes illumination of said pointer. At the same time a horn signal is given so as to attract the attention by motorist or pedestrian to the visible signal.

The arrow shaped pointers 20 and 21 are pivoted on pivots 26 adjacent their upper ends so that the pointers normally extend vertically downward. To upwardly extending portions 27 of the pointers are attached end of a cable 28 which is connected through pulleys 29 and 31 to the actuating mechanism hereinafter described so that as the cable 28 is retracted by actuation of the lever 23 the arrow shaped pointers are caused to pivot about the pivot 26 and assume an angle with respect to the vertical. In the preferred embodiment shown in the drawings two positions of the pointers 20 are provided, one approximately horizontal position 32 for indication of a left turn of the vehicle and one position 33 pointing downward at an angle of approximately 45° indicating full stoppage of the vehicle. When the levers have assumed either position by electric circuits hereinafter described the arrows are illuminated by bulbs 34 fixed thereupon.

Figure 2:
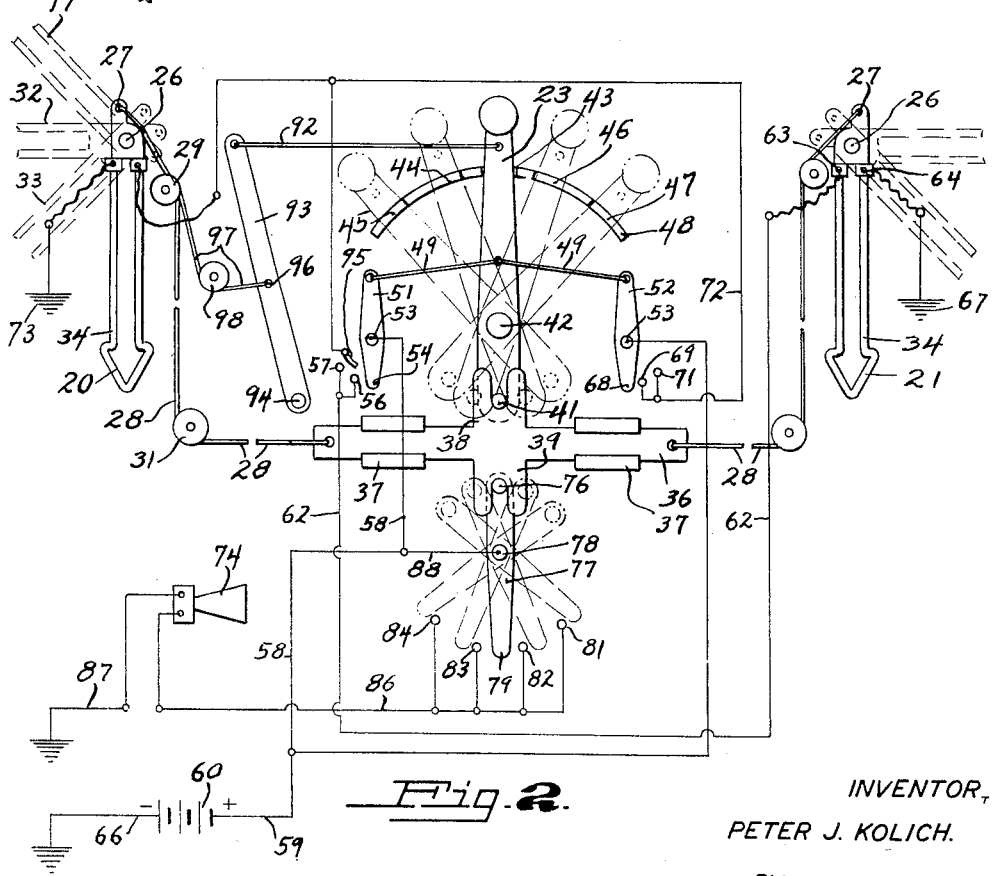
Fig. 2 is a schematic view showing the essentials of the mechanical and electrical circuit for operation of the device.

The inner ends of cables 28 are attached to non-conductive shifter bar 36 which is held for horizontal reciprocating movement in guideways 37. The shifter bar is elongated in a horizontal direction and approximately midway of its length there are provided two vertically disposed bifurcated extensions 38 and 39. The upper extension 38 is adapted to receive a pin 41 attached to the lower end of pivoted actuating lever 23 said actuating lever being pivoted at 42. Thus, as indicated in Fig. 2, as the actuating lever 23 is swung towards the left, the pin 41 is swung toward the right and correspondingly the shifter bar 34 is moved toward the right, thus pulling or retracting the cable 28 and causing the left hand pointer 20 to extend outside its housing 22 and assume an angle with respect to the vertical. A portion of the actuating lever 23 engages notches 43 to 47 inclusive in the quadrant 48. The central notch of the quadrant 48 is designed to engage the actuating lever 23 and hold it in position when no turn or stop is indicated. The two notches 44 and 46 immediately to either side of the central notch 43 of the quadrant are intended to engage the actuating lever when it is desired to signal a stop, and the extreme outward notches 45 and 47 are designed to engage the lever for indication of left and right turns, respectively. Hence if the operator of the vehicle intends to make a left turn, he grasps the actuating lever 23 and pushes it towards the left where it engages the left turn notch 45 of the quadrant 48, and this results in the left hand pointer 20 assuming a horizontal position, as has already been described. Similarly, if a right turn is intended the operator pushes the actuating lever 23 to the extreme right notch 47 and the pointer 21 on the right hand side of the vehicle assumes a horizontal position. When it is desired to signal an intended stop, the actuating lever 23 may be moved to either of the intermediate notches 44 or 46, the choice of the left or right hand intermediate notch being optional with the operator depending on which side traffic is most likely to try to pass the vehicle.

Simultaneously with the extension of the arrow shaped pointers 20 and 21 from their housings 22 illumination of the arrows is accomplished by an electrical circuit. Establishment of the electrical circuit is made by movement of the actuating lever 23. A non-conductive bar 49 is attached to the lever 23 above its pivot point 42 and to opposite ends of said rigid bar are attached switch members 51 and 52. The switch members are pivoted midway of their length at pivots 53 and their opposite ends carry contact members 54 to engage fixed contact points 56 and 57. A lead wire 58 is attached to one of the poles 59 of electrical battery 60 and to the switch member 51. The contact elements 56 and 57 are attached by lead wire 62 to a terminal 63 of the right hand arrow 21 and one end of the filament of said illuminating bulb 34 is likewise attached to said terminal. The other end of the filament of said illuminating bulb 34 is attached to terminal 64 which is grounded to the vehicle body at 67. The opposite pole 66 of the battery 60 is likewise grounded. Thus, when the contact element 54 engages either the contact element 56 or the contact element 57, an electrical circuit is closed which results in illumination of the right turn indicator 21 when either a stop or a right turn is being signalled. Correspondingly, shifting of the actuating lever 23 to the left to indicate either a stop or a left turn brings the contact member 68 into engagement with either the contact member 69 or 71 and this establishes through lead wire 72 and ground 73 illumination of the bulb 34 in the left hand pointer 20.

The lower extension 39 of the shifter bar 36 is designed to control sounding of the horn 74 of the vehicle on which the mechanism is installed or other audible signal. The fork of extension 39 engages a pin 76 attached to one end of lever 77 pivoted approximately midway of its length at pivot 78, and the opposite end of which bears the electrical contact point 79. As the actuating lever 23 is swung about its pivot 42, lever 77 is likewise pivoted about its pivot 78, and the contact point 79 passes over stationary contact points 81 to 84 inclusive, all of which are connected by lead wire 86 to one terminal of horn 74, and the other horn terminal is grounded at 87. Pole 59 of battery 61 is connected by lead wires 58 and 88 to the lever 77. The contact point 83 is fixed at a position slightly in advance of the position which contact point 79 assumes when a stop signal is being shown on the left hand side of the vehicle. Thus, the horn sounds slightly before the pointer assumes the stop position but does not continue to sound during the entire time while such signal is being exhibited on the vehicle. Similarly, in the case of a left turn signal when the contact point 79 passes over contact points 83 and 84, the horn sounds twice briefly in order to direct attention to the exhibition of the signal. A single sounding of the horn upon exhibition of the pointer on a right hand side of the vehicle in stop position and a double sounding of the horn when said pointer assumes a right hand signal is made.

The mechanism for moving the left and right hand pointers, the mechanism for controlling the illumination of the pointers and the mechanism for sounding the horn are all enclosed in a suitable casing 89 mounted on the dashboard 24 of the vehicle in such position as not to obstruct the view of the operator through the windshield 91 of the vehicle.

When it is contemplated that a right turn will be made, it is desirable that in addition to the pointer on the right hand side of the vehicle being elevated to the horizontal, the pointer on the left hand side of the vehicle should be elevated to point upwardly at an angle of approximately 45°. In order to accomplish this result a rigid bar 92 is fastened to the actuating lever 23 and attached at its opposite end to one extremity of a lever 93 which is pivoted at its opposite and lower extremity by pivot 94. Approximately midway of the length of the lever 93 is located cable connection 96 to which is connected one end of flexible cable 97, the opposite end of which is attached to upper portion 27 of the left hand pointer 20. The cable is guided by pulley 98. Thus, when the actuating lever 23 is moved to the extreme right hand notch 47 of quadrant 48, the cable 92 pulls lever 93 to the right and this motion is transmitted through cable 97 to elevate the left hand pointer 20 to an angle of 45° above the horizontal as shown by reference numeral 99 in Fig. 2, thus indicating a contemplated right turn. In order that the pointer 20 be illuminated when indicating a right turn, a contact point 95 is positioned for engagement with contact 54 on switch member 51. Thus, the contact member 54 engages both contact 57 and contact 95 when the actuating lever 23 is at notch 47 and the pointers 21 and 20 are both illuminated.

It is understood that the invention has been illustrated and described in specific form for purposes of clarity of understanding by way of example but that various changes in assembly and design and the like may be practiced within the spirit of the invention and scope of the appended claim.

I claim:

Turn and stop indicators comprising a pair of arrow shaped pointers mounted exteriorly on opposite sides of a vehicle, a pair of housings normally concealing said pointers, a cable connected at one end to the right hand pointer for pivoting said pointer to extend outside its housing and exhibit a visible signal for an intended right hand turn, a slidable bar connected to the opposite end of said cable and mounted on said vehicle, a pivoted actuating lever manually operable to slide said bar, an electric switch element connected for movement by and with said actuating lever and establishing contact with a contact point to close an electric circuit to illuminate said indicator, a second electric switch element connected for movement by and with said actuating lever and establishing contact with a contact point to close an electric circuit to energize an audible signal slightly prior to said indicator arriving in indicating position, a pivoted lever connected for movement by and with said actuating lever, a cable connected to said pivoted lever at one end and connected at its opposite end to the left hand pointer for moving said left hand pointer to exhibit a visible signal for an intended right hand turn.

PETER J. KOLICH.

REFERENCES CITED

The following references are of record in the file of this patent:

UNITED STATES PATENTS

| Number | Name | Date |
|---|---|---|
| 1,525,593 | Scoggins et al. | Feb. 10, 1925 |
| 1,731,569 | Harbord | Oct. 14, 1929 |
| 1,770,083 | Meehan | July 8, 1930 |
| 1,822,017 | David | Sept. 8, 1931 |
| 2,055,402 | Colla et al. | Sept. 22, 1936 |
| 2,116,694 | Chang | May 10, 1938 |
| 2,240,984 | Desaulniers et al. | May 6, 1941 |